(12) United States Patent
Steinmetz et al.

(10) Patent No.: US 9,631,689 B2
(45) Date of Patent: Apr. 25, 2017

(54) METHOD AND INSTALLATION FOR APPLYING FRICTION LINING ELEMENTS TO A FRICTION LINING SUPPORT

(71) Applicant: Schaeffler Technologies AG & Co. KG, Herzogenaurach (DE)

(72) Inventors: Stefan Steinmetz, Esslingen (DE); Patrick Knecht, Muggensturm (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/431,068

(22) PCT Filed: Sep. 11, 2013

(86) PCT No.: PCT/DE2013/200168
§ 371 (c)(1),
(2) Date: Mar. 25, 2015

(87) PCT Pub. No.: WO2014/053129
PCT Pub. Date: Apr. 10, 2014

(65) Prior Publication Data
US 2015/0260250 A1    Sep. 17, 2015

(30) Foreign Application Priority Data

Oct. 2, 2012  (DE) .................. 10 2012 218 018

(51) Int. Cl.
*F16D 69/04* (2006.01)
*F16D 55/00* (2006.01)
*F16D 69/00* (2006.01)

(52) U.S. Cl.
CPC ......... *F16D 69/04* (2013.01); *F16D 69/0408* (2013.01); *F16D 2055/0058* (2013.01);
(Continued)

(58) Field of Classification Search
CPC ................ F16D 69/04; F16D 69/0408; F16D 2055/0058; F16D 2069/009;
(Continued)

(56) References Cited

U.S. PATENT DOCUMENTS 2,692,843 A   10/1954   Winther
4,747,476 A   5/1988   East et al.
(Continued)

FOREIGN PATENT DOCUMENTS

CN   86104765 A   1/1987
CN   1440495 A   9/2003
(Continued)

OTHER PUBLICATIONS

Machine Translation of EP 1 030 075 A1; Franz Strohmann; Jan. 10, 2000.*
Machine translation of EP 1 030 075 A1.*

*Primary Examiner* — Jacob T Minskey
*Assistant Examiner* — Vishal I Patel
(74) *Attorney, Agent, or Firm* — Volpe and Koenig, P.C.

(57) ABSTRACT

A method for applying friction lining elements to a friction lining support is provided. The invention is characterized in that friction lining elements are applied simultaneously to opposite sides of the friction lining support.

9 Claims, 1 Drawing Sheet

(52) U.S. Cl.
CPC ............... *F16D 2069/009* (2013.01); *F16D 2069/0466* (2013.01); *F16D 2069/0483* (2013.01); *F16D 2069/0491* (2013.01); *F16D 2200/0082* (2013.01); *F16D 2250/0069* (2013.01); *F16D 2250/0092* (2013.01); *Y10T 156/10* (2015.01); *Y10T 156/107* (2015.01); *Y10T 156/12* (2015.01); *Y10T 156/1744* (2015.01)

(58) Field of Classification Search
CPC ..... F16D 2069/0466; F16D 2069/0483; F16D 2250/0069; F16D 2250/0092; F16D 2200/0082; F16D 2069/0491; Y10T 156/1744; Y10T 156/10; Y10T 156/12
See application file for complete search history.

(56) References Cited

U.S. PATENT DOCUMENTS

| | | | |
|---|---|---|---|
| 5,713,450 | A | 2/1998 | Quigley |
| 2004/0099493 | A1 | 5/2004 | Himmelsbach et al. |
| 2004/0163901 | A1 | 8/2004 | Thomas et al. |

FOREIGN PATENT DOCUMENTS

| | | |
|---|---|---|
| CN | 1519486 A | 8/2004 |
| DE | 69701946 | 4/1998 |
| EP | 0833069 | 4/1998 |
| EP | 1030075 | 8/2000 |

\* cited by examiner

METHOD AND INSTALLATION FOR APPLYING FRICTION LINING ELEMENTS TO A FRICTION LINING SUPPORT

BACKGROUND

The invention relates to a method and an installation for applying friction lining elements to a friction lining support.

A friction disk with friction linings made from segments is known from the German translation DE 697 01 946 T2 of the European patent publication EP 0 833 069 B1.

SUMMARY

The objective of the invention is to simplify the application of friction lining elements to a friction lining support.

The objective is attained in a method for applying friction lining elements to a friction lining support such that simultaneously friction lining elements are applied on two opposite sides of the friction lining support. The friction lining elements are preferably segmented and are also called friction lining pads. The friction lining support preferably represents a support sheet, particularly made from steel sheeting. When applying the friction lining elements on the friction lining support the friction lining elements are at least basted at the two opposite sides of the friction lining support. The basting is also called tacking. The application of the friction lining elements on two opposite sides of the friction lining support yields the advantage, on the one hand, that an expensive turning unit can be omitted for the friction lining support. Furthermore, by the application of the friction lining elements at both sides of the friction lining support here the force management is considerably simplified, because in an application of the friction lining elements at both sides of the friction lining support the forces applied mutually compensate each other.

A preferred exemplary embodiment of the method is characterized in that the friction lining elements on the opposite sides of the friction lining carrier are generated from friction lining—semi-finished products before or during the application process of the friction lining elements on opposite sides of the friction lining support. The friction lining elements are advantageously generated directly before or during the application process on the friction lining support. This considerably facilitates the handling of the friction lining elements.

Another preferred exemplary embodiment of the method is characterized in that the friction lining elements on the opposite sides of the friction lining support are punched from friction lining—semi-finished products before or during the application process of the friction lining elements on the opposite sides of the friction lining support. It is particularly advantageous for the friction lining elements each to be punched from the friction lining semi-finished product with a single motion and applied on the opposite sides of the friction lining support. This way the application of the friction lining elements to the friction lining support can be considerably accelerated.

Another preferred exemplary embodiment of the method is characterized in that the friction lining elements on the opposite sides of the friction lining support are compressed with the friction lining support and/or heated during or after the punching process. It is perhaps possible to directly insert the thermal energy required for curing the friction linings directly into the friction lining elements during the punching process. Alternatively or additionally the friction lining support with the basted friction lining elements can also be fed jointly to a hot press in order to cause the final curing and/or bonding of the friction lining elements with the friction lining support.

Another preferred exemplary embodiment of the method is characterized in that an adhesion-generating medium is applied on the friction lining support before the friction lining elements are applied on the opposite sides of the friction lining support. The adhesion-generating medium represents a solvent and/or an adhesive, for example. The adhesion-generating medium serves to fix the friction linings to the friction lining support before they are finally connected fixed to the friction lining support and/or bonded therewith, for example in a hot press. The adhesion-generating medium may be applied for example via a spraying, jet-spraying, or contacting method onto the friction lining support.

Another preferred exemplary embodiment of the method is characterized in that the friction lining support, prior to the friction lining elements being applied at both sides thereof, particularly from the bottom and from the top, is provided with a basic adhesive coating. The preferred metallic friction lining support is coated at both sides with glue, for example phenol resin glue. The coating is also called a basic adhesive coating. The application of the glue may occur by way of immersion of the friction lining support into an adhesive bath or via at least one roller element or via several roller elements. The adhesive dries after the application and, in a hypothetical contacting with the friction lining elements, would or would not hold them in this stage.

Another preferred exemplary embodiment of the method is characterized in that at least one of the following further treatment steps is performed in order to achieve adhesion or fastening of the friction lining elements to the friction lining support provided with the basic adhesion glue. According to a first variant the friction lining support with the dried basic adhesive coating at both sides is heated; by the heating process the dried basic adhesion lining is liquefied such that an adhesive state is achieved. According to a second variant, solvent is applied on both sides onto the dried basic adhesive coating; the solvent is for example sprayed onto the dried basic adhesive coating such that the basic adhesive coating is liquefied again. Subsequently the friction lining elements, also called pads, are applied. With the solvent a once more adhesive state of the dried basic adhesive coating is generated. According to a third variant, adhesive glue is applied on the dried basic adhesive layer at both sides; the adhesive glue can be sprayed onto the dried basic adhesive coating in a preliminary unit. The adhesive glue can be applied for example in a helical form. The adhesive glue may be similar or identical to the adhesive which forms the basic adhesive coating. By the application of the basting glue or adhesive glue once more an adhesive state of the dried basic adhesive coating is generated. According to a fourth variant the basting glue or adhesive glue is applied on the uncoated friction lining support at both sides, thus from the top and from the bottom, particularly sprayed thereon, for example in a helical form. Then the application of the basic adhesive coating can be omitted.

In an installation for applying friction lining elements to a friction lining carrier, particularly according to one of the above-described methods, the above-stated objective is alternatively or additionally attained such that devices are arranged on two opposite sides of the friction lining support, by which simultaneously friction lining elements can be applied on two opposite sides of the friction lining support. The devices preferably serve to fix the friction lining elements, particularly segmented friction linings, on the friction lining support, particularly a support sheet, before the friction lining support with the friction lining elements fixed thereon is fed to a hot press. In a particularly advantageous fashion the arrangement is also suitable to apply the friction lining elements only to one side of the friction lining support, if necessary.

A preferred exemplary embodiment of the installation is characterized in that the devices are embodied as automatic cutting presses. Using the automatic cutting presses the friction lining elements can be punched out in one processing step from a friction lining semi-finished product and applied at the friction lining support.

Another preferred exemplary embodiment of the installation is characterized in that a first device, in reference to the earths' gravity, is arranged above the friction lining support, with a second device being arranged, in reference to the earths' gravity, below the friction lining support. The friction lining support is therefore arranged between the two devices in reference to the earth's gravity. By this installation the friction lining elements can be advantageously fixed in opposite feeding directions both from the bottom as well as from the top simultaneously on the friction lining support.

Another preferred exemplary embodiment of the installation is characterized in that the installation comprises a round table, which is arranged partially between the devices, by which simultaneously friction lining element can be applied on two opposite sides of the friction lining support. Here, the devices are advantageously displaceable in a radial direction towards a center of the round table and away from said center.

Another preferred exemplary embodiment of the installation is characterized in that the devices are combined with at least one application device, preferably with one application device each, for applying a medium upon the friction lining elements and/or the friction lining semi-finished products. The medium represents preferably an adhesion-generating medium, such as a solvent or adhesive glue. The adhesion-generating medium serves to baste the friction lining elements to the friction lining support before the friction lining support with the friction lining elements fixed thereon is fed to a hot press. The application device represents for example a spraying or jet-spraying device.

BRIEF DESCRIPTION OF THE DRAWINGS

Additional advantages, features, and details of the invention are discernible from the following description, in which various exemplary embodiments are described in detail with reference to the drawing. Shown here are.

DETAILED DESCRIPTION OF THE PREFERRED EMBODIMENTS

Figure 1:
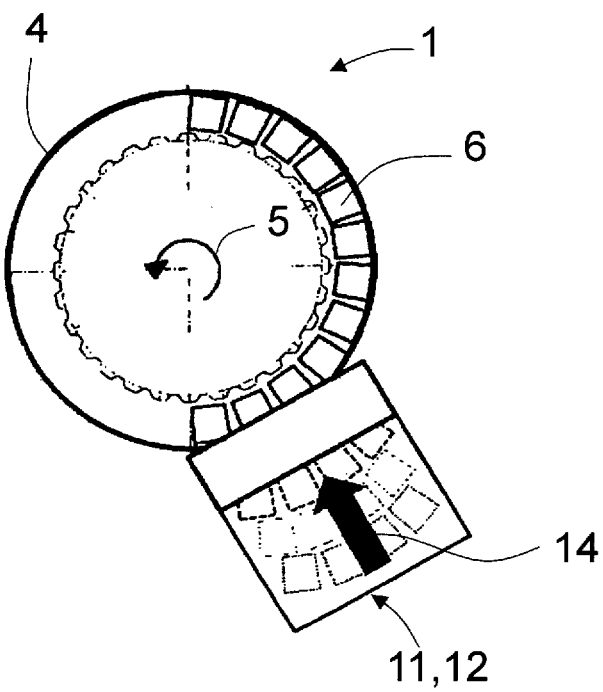
FIG. 1 a simplified illustration of an installation according to the invention in a top view, and FIG. 2 the installation of FIG. 1 in a front view.
Figure 2:
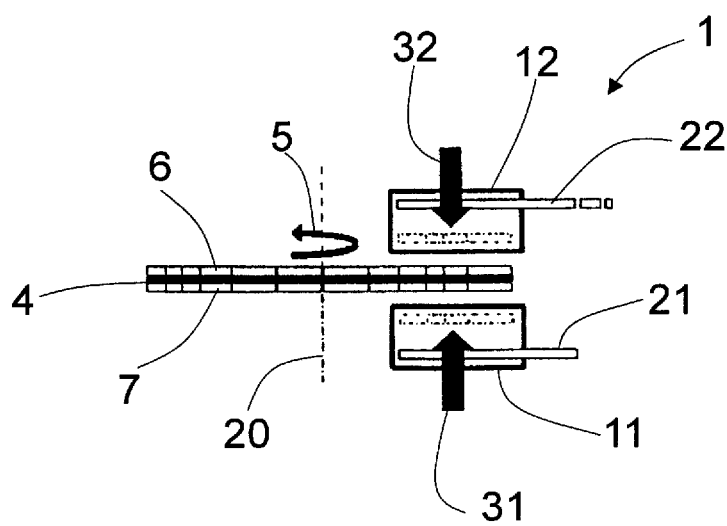

FIGS. 1 and 2 shows in various views and in a very simplified fashion an installation 1 for applying friction lining elements 6, 7 at a friction lining support 4. The friction lining support 4 represents a support sheet, which for example is arranged rotationally on a round table. An arrow 5 indicates that the friction lining support 4 in FIG. 1 is rotational in the clockwise direction. The friction lining support may also be rotational in the clockwise direction.

The friction lining elements 6, 7 represent segmented friction linings, which are also called friction lining pads. The friction lining pads 6, 7 are fixed with the help of the installation 1 according to the invention on the friction lining support 4. The fixation of the friction lining elements 6, 7 or friction lining pads is also called basting or tacking. In a subsequent processing step the friction lining support 4 with the basted friction lining elements 6, 7 is fed to a hot press in order to connect the friction lining elements 6, 7 in a fixed manner to the friction lining support 4 and/or to each other.

The installation 1 comprises two devices 11, 12 by which the friction lining elements 6, 7 can be applied in a particularly advantageous fashion on opposite sides of the friction lining support 4. FIG. 2 then shows that the two devices 11, 12 are arranged on two opposite sides of the friction lining support 4. In FIG. 1 it is indicated by an arrow 14 that the two devices 11, 12 can be moved towards a center of the friction lining support 4 such that a portion or section of the friction lining support 4 is arranged between the two devices 11, 12, as discernible from FIG. 2.

Indicated in FIG. 2 is an axis of rotation 20 of the friction lining support 4 and/or the round table, on which the friction lining support 4 is arranged. The friction lining support 4 is rotational on the round table, as indicated by the arrow 5. The axis of rotation 20 is equivalent to an effective line of the earth's gravity.

The device 11 is arranged at the left in FIG. 2, thus below the friction lining support 4. The device 12 is arranged at the right in FIG. 2, thus above the friction lining support 4. Accordingly a portion of section of the friction lining support 4 is arranged between the two devices 11, 12.

The devices 11, 12 are embodied as automatic cutting presses. The friction lining elements 6, 7 are supplied to the automatic cutting presses 11, 12 in the form of friction lining semi-finished products. The arrows 31, 32 indicate that four friction lining elements 6, 7 each are cut from the friction lining semi-finished products 21, 22 with the help of the devices 11, 12 and fixed on the friction lining support 4.

According to another aspect of the invention application installations are arranged upstream in reference to the round table stations for applying a medium on the friction lining support 4. The application installations preferably represent spray devices, by which an adhesion-generating medium is applied at both sides on the friction lining support 4 before the friction lining semi-finished products 21, 22 are supplied to the automatic cutting presses 11, 12. The adhesion-generating medium represents a basting glue or adhesive glue, by which the friction lining elements 6, 7 can be fixed on the friction lining support 4.

The friction lining support 4 is supplied with the friction lining elements 6, 7 basted thereon to a hot press, in order to connect the friction lining elements 6, 7 to each other and to the friction lining support 4 in a fixed manner. Here, the friction lining elements 6, 7 with the friction lining support 4 preferably serve for forming wet-running friction lining lamellae of multiple disk clutches.

The friction lining elements 6, 7 may comprise phenol resin as a binder. The binder is cured in the hot press. The friction lining elements 6, 7 may also be formed from a thermoset-elastomer material compound. The friction lining elements 6, 7 may furthermore be produced from a wound compound comprising a yarn saturated with a resin mixture.

The friction lining support 4 preferably represents a metallic support element, which is coated at both sides with an adhesive, for example phenol resin glue. This coating is also called the basic adhesive coating. The application of the adhesive may occur by immersion of the support element in an adhesive bath or by one or more roller elements. After the application of the adhesive, four different variants may be performed for further processing.

In a first variant the dried basic adhesive coating is heated via temperature from both sides, i.e. from the top and the bottom, and liquefies again. By the heating process a once more adhesive state is generated by heating the basic adhesive coating.

In a second variant a solvent is sprayed at both sides onto the dried basic adhesive coating so that the basic adhesive coating liquefies again. Subsequently the friction lining elements 6, 7, also called pads, can be applied in the installations 11, 12. In the second variant the once more adhesive state of the dried basic adhesive coating is generated by solvents.

In a third variant a sprayable basting glue or adhesive glue is sprayed onto the dried adhesive of the basic adhesive coating at both sides in a preliminary unit. The basting glue or adhesive glue may be applied in a helical fashion, for example. The spraying of the basting glue or adhesive glue once more generates an adhesive state of the dried basic adhesive coating.

In a fourth variant the support element is not provided with a basic adhesive coating. Instead, the above-described basting glue or adhesive glue of the third variant is applied at both sides, thus from the top and from the bottom, onto the uncoated metal of the friction lining support 4, particularly sprayed on, for example in a spiral fashion. An adhesive state is generated by applying said basting glue or the adhesive glue.

The second variant is particularly preferred. All variants shown are implemented at a round table. The above-described variants are preferably executed in a preliminary station upstream in reference to the devices 11, 12 of the round table. Here, the friction lining support 4 can remain passive during the implementation of one of the variants over several rotations until the adhesion of the friction lining elements and/or pads is sufficiently prepared. Only then the devices or stations 11, 12 become active.

All above-described four methods are suitable for a treatment of the friction lining support 4, both from the top as well as from the bottom. The treatment of the friction lining support 4 from the bottom is particularly possible by the fact that the above-described variants can be implemented without drop formation. After the implementation of at least one of the above-described variants a hot pressing step is performed in order to further crosslink the adhesive. The adhesive preferably represents phenol resin glue.

LIST OF REFERENCE CHARACTERS

1 Installation
4 Friction lining support
5 Arrow
6 Friction lining element
7 Friction lining element
11 Device
12 Device
14 Arrow
20 Axis of rotation
21 Friction lining semi-finished product
22 Friction lining semi-finished product
31 Arrow
32 Arrow

The invention claimed is:

1. A method for applying friction lining elements to a friction lining support, comprising:
   arranging friction lining installation devices on opposite sides of the friction lining support;
   adjusting the friction lining installation devices radially inwardly and radially outwardly with respect to the friction lining support;
   rotating the friction lining support; and
   simultaneously applying the friction lining elements on two opposite sides of the friction lining support.

2. The method according to claim 1, further comprising making the friction lining elements on opposite sides of the friction lining support from friction lining semi-finished products before or during the application of the friction lining elements on the opposite sides of the friction lining support.

3. The method according to claim 1, further comprising punching the friction lining elements on the opposite sides of the friction lining support from friction lining semi-finished products before or during the applying of the friction lining elements on the opposite sides of the friction lining support.

4. The method according to claim 3, further comprising during or after the punching process, compressing the friction lining elements to the opposite sides of the friction lining support with the friction lining support.

5. The method according to claim 2, further comprising providing the friction lining support at both sides with a basic adhesive coating prior to application of the friction lining elements.

6. The method according to claim 5, further comprising at least one of the following further treatment steps is performed:
   a) heating the friction lining support with a dried basic adhesive coating at both sides;
   b) applying solvent at both sides onto the dried basic adhesive coating;
   c) applying a basting glue at both sides onto the dried basic adhesive coating.

7. The method according to claim 4, further comprising heating the friction lining elements as they are being applied to the friction lining support.

8. The method according to claim 1, wherein the friction lining support is arranged on a rotating round table.

9. The method according to claim 1, wherein segmented friction lining elements are applied to a circumferential arc of the friction lining support.

* * * * *